United States Patent [19]

Miller et al.

[11] 3,887,009

[45] June 3, 1975

[54] DRILLING MUD-CEMENT COMPOSITIONS FOR WELL CEMENTING OPERATIONS

[75] Inventors: Geo. L. Miller, Houston, Tex.; Horst K. F. Barthel, Hamburg, Germany

[73] Assignees: Oil Base, Inc., Houston, Tex. ; by said Miller; Oil Base Germany, G.m.b.H., Hamburg, Germany; by said Barthel

[22] Filed: Apr. 25, 1974

[21] Appl. No.: 463,899

[52] U.S. Cl. ................................................. 166/292
[51] Int. Cl. ........................ E21b 33/13; E21b 33/14
[58] Field of Search ........... 166/292, 293; 106/105, 106/106, 118, 120, 121

[56] References Cited
UNITED STATES PATENTS

| | | | |
|---|---|---|---|
| 1,634,505 | 7/1927 | McCaughey | 106/106 |
| 2,649,160 | 8/1953 | Williams et al. | 106/106 X |
| 2,649,160 | 8/1953 | Williams et al. | 166/292 |
| 3,168,139 | 2/1965 | Kennedy et al. | 166/293 X |
| 3,208,523 | 9/1965 | Coyle et al. | 166/292 |
| 3,409,093 | 11/1968 | Cunningham et al. | 166/293 X |
| 3,447,938 | 6/1969 | Vassilevsky | 106/106 X |
| 3,499,491 | 3/1970 | Wyant et al. | 166/292 |
| 3,526,172 | 9/1970 | Stuart | 166/292 X |
| 3,701,384 | 10/1972 | Routson et al. | 166/292 |

Primary Examiner—Stephen J. Novosad

[57] ABSTRACT

A low clay content aqueous drilling mud or a magnesium salt-based aqueous drilling mud may be transformed into cement for well cementing by addition of magnesium oxide, magnesium sulfate and dolomite or magnesium carbonate to produce a magnesium oxysulfate cement.

3 Claims, No Drawings

DRILLING MUD-CEMENT COMPOSITIONS FOR WELL CEMENTING OPERATIONS

BACKGROUND OF THE INVENTION

The instant invention relates to the cementing of well boreholes. More particularly, the instant invention provides a method and composition for transforming a water base drilling fluid into a hardened cement in order that well cementing operations may be carried out with increased efficiency.

For safe completion of an oil or gas well, it is generally necessary to cement strings of well casing through various sections of the well bore, including producing horizons to effectively seal off the annular space between the casing and wall of the well bore.

A number of various hydraulic cements (capable of setting under water) have been used for this purpose, for example, pozzolan, Portland, or aluminous cement, and various high temperature cements. So long as oil and gas wells were being produced using open hole techniques, use of such high strength cements seemed desirable. However, in more recent years, wells have been completed by setting and cementing casing through productive horizons, and then obtaining production by perforating the section of casing opposite the desired interval. When perforation is undertaken, the perforating operation can result in fracturing or shattering of the cement when high strength cements are employed, resulting in the failure of the cement to exclude from the borehole undesired contaminants such as water originating from other horizons remote from the perforation. Accordingly, extremely high strength cements were found not to be a requirement and even disadvantageous at times in well cementing operations.

Cements used in well operations were therefore modified by addition of bentonite or clay to form "gel cements" which provided a lower strength composition which afforded better perforation characteristics as well as a lighter overall slurry weight to the cement slurry as a result of the ability of various types of clays to swell in the presence of water.

Another difficulty in well cementing operations descends from the existence of the drilling mud filter cake on the borehole wall. In order to prevent escape of fluids from the borehole into the formations during drilling operations, drilling fluids are typically designed to deposit a cakelike sheath on the exposed surface of the borehole in order to inhibit the migration of fluids into the formations being drilled. This filter cake typically remains, however, when later cementing operations are undertaken. The residue of the filter cake remaining on the exposed face of the formation can prevent the development of a good bond between the cement and the exposed formation. This again can diminish the effectiveness of the seal provided by the cement in the annular space between the liner and the face of the formation.

It has been suggested that these latter problems can be eliminated by creating a mud-cement system in which the drilling mud used for drilling the borehole is transformed into a solid cement mass thereby increasing the compatibility between the drilling mud system and the cement system as well as providing better bonding at the interface of the formation and mud filter cake. In an article entitled "A New Material to Cement Well Casing," Oliver and Jones, *The Oil and Gas Journal*, Oct. 13, 1969, p. 95–96, there is suggested a material which allows drilling fluids to be used in preparing custom slurries for downhole casing cement. The resulting mud-concrete product, the nature of which is not disclosed, was indicated to be compatible with a number of different mud systems, including lignosulfonate drilling muds. However, it appears that the material contemplated in this article was one in which some type of cementitious material was added to the mud and solidified the mud. It would not appear that the product referred to in that article involved a system wherein the contents of the mud participated in the solidifying or cementing reaction.

Recently, there have been developed clay-free drilling muds formulated from inorganic salts, particularly magnesium salts. Drilling fluids of this character are disclosed in co-pending patent application Ser. No. 300,389, entitled "Aqueous Sea-Water Drilling Fluids", filed Oct. 24, 1972. These compositions provide acid soluble aqueous drilling muds which can be formulated with sea water and are free of potentially ecologically-contaminating heavy metal salts. Accordingly, the use of such fluids at offshore locations and even for land drilling can be highly advantageous.

The prior art has also recognized the possibility of utilizing one or more of various magnesium cements for purposes of well cementing operations. One well known magnesium cement is magnesium oxychloride cement or Sorel cement produced from magnesium oxide or (a suitable type of active magnesia such as calcined magnesite) mixed with a magnesium chloride solution (e.g., see U.S. Pat. No. 1,634,505 issued July 5, 1927). Another form of magnesium cement is magnesium oxysulfate cement derived by mixing magnesium oxide in a form such as specified above with a magnesium sulfate solution. In U.S. Pat. No. 2,378,687 issued June 19, 1945, it is suggested that earth formations, including formations of well boreholes may be sealed by introducing magnesium into the location to be sealed and thereafter contacting the magnesium with a corrosive liquid capable of forming a solid water insoluble product upon reaction with the magnesium. Suitable solutions to be contacted with the magnesium include sodium chloride, ammonium chloride, sodium sulfate and magnesium sulfate. In U.S. Pat. No. 2,649,160 issued Aug. 18, 1953, it is suggested that well cementing can be undertaken by first forming a cementitious filter cake composed of an oxychloride or oxysulfate cement and thereafter completing the cementing operation with ordinary cement type materials. It is suggested that the drilling fluid used for drilling be formed by adding a quantity of one reagent such as magnesia (a form of magnesium oxide) which is essential to make an oxychloride or oxysulfate cement. Thereafter the filter cake is contacted with a solution of, for example, magnesium chloride in order to convert the filter cake into magnesium oxychloride cement. This forms a cementitious filter cake which thereafter will resist channeling and improve the bond between a subsequent standard cement and the hardened filter cake.

Magnesium oxychloride cement or Sorel cement in particular has disadvantages when used for well cementing operations. Initially, this material has the disadvantage that it is not resistant against dissolved magnesium sulfate which might be present in the inflow of water or brine in the borehole. Furthermore, the hardening time of Sorel cement is difficult to regulate. It is of significant importance in well cementing operations to provide a cement composition which has a hardening time which is sufficient to permit pumping the placement of the cement slurry at the desired interval in the borehole before hardening commences.

SUMMARY OF THE INVENTION

In accordance with the instant invention, there is provided herein a method and composition for drilling and cementing well boreholes in accordance with which a magnesium oxysulfate cement is formed in the drilling mud. More particularly this invention provides a method and composition wherein the drilling fluid is transformed into a cementitious mass of magnesium oxysulfate cement thereby increasing the compatibility of the cementing composition with the drilling fluid and improving the cement bond to the face of the borehole. This is accomplished by forming a magnesium oxysulfate cement from a magnesium inorganic salt-based drilling fluid to produce an economical and sufficiently strong expansive cement having acceptable setting time for well cementing purposes. The cement compositions may be formed using water or brine solution rather than mud if desired. Hence, brine or water may be added as desired to modify the viscosity characteristics of the cement.

The method of this invention involves cementing a well borehole or sealing off the formations in a well borehole containing a magnesium inorganic salt-based drilling fluid which comprises admixing with the drilling fluid magnesium sulfate and magnesium oxide in an amount sufficient to transform the mud into a magnesium oxysulfate cement, and pumping the mixture so obtained to the desired interval in the borehole to permit setting of the cement.

The drilling fluids which are employed in accordance with this invention and which are transformed into cement in accordance herewith are disclosed in copending application Ser. No. 300,389, entitled "Aqueous Sea-Water Drilling Fluids" and filed Oct. 24, 1972. The contents of that application are herein incorporated by reference as a disclosure of compatible drilling fluids which may be employed in accordance with the methods and compositions of this invention to cement a borehole.

In accordance with the method of this invention, cementing of a well borehole may be carried out by mixing with a driling fluid comprising an aqueous brine solution and an additive system including magnesium sulfate and carbonates of magnesium and calcium, a mixture of magnesium oxide and magnesium sulfate in amounts sufficient to increase the concentration of magnesium oxide to at least about 15 pounds per barrel and the concentration of magnesium sulfate to at least 40 pounds per barrel. The overall system after addition should contain no more than about 50 percent by weight of water, and hence additional amounts of magnesium oxide, magnesium sulfate or materials such as magnesium carbonate or dolomite or fillers may also be added. Although magnesium carbonate and dolomite may be regarded as performing a filler function, it is possible that the magnesium carbonate may participate in a chemical reaction and hence it may be that the magnesium carbonate when used contributes to the cementing reaction.

The compositions of this invention preferably include magnesium carbonate and/or dolomite in amounts ranging from about 30 pounds per barrel to be added with the magnesium oxide and magnesium sulfate as outlined above.

In accordance with a further aspect of this invention, sodium tetraborate may be used as a retarder for the cement in order to delay setting time without significant loss of strength in the compositions.

DESCRIPTION OF SPECIFIC AND PREFERRED EMBODIMENTS

As pointed out above, the strength requirements for well cements is not demanding, and ordinarily it is sufficient for well cementing operations to provide a cement composition having a strength of about 500 pounds per square inch after 4 hours measured by API standards. Other necessary characteristics of well cements include low permeability in order to insure the soundness of the formation seal, and sufficient thickening time and setting times to permit placement of the cement slurry. In connection with the latter, under pressure the thickening time of cements can decrease significantly. The magnsium oxysulfate cements of this invention have a density of about 1.7 grams/cm$^3$ depending upon composition whereas most oil well cements have densities of about 2.5 grams/cm$^3$. Hence, the hydrostatic pressure in a cement column in a borehole using the compositions and methods of this invention is significantly reduced, and consequently setting times and thickening times are more flexibly controlled.

In accordance with this invention there is obtained a cement composition which can be formulated to widely varying strengths, which can be readily controlled as to setting time and thickening time and which demonstrates desirably low permeability.

In order to demonstrate the advantages of magnesium oxysulfate cements over Sorel cements of the magnesium oxychloride type, parallel tests were conducted using a magnesium oxysulfate cement composition in accordance with this invention and a parallel magnesium oxychloride cement. Strength was measured after 24 hours using API methods. Percentages are by weight, the remainder being water.

Table I

| Magnesium oxide % by wt | Dolomite % by wt | MgSO$_4$. H$_2$O % by wt | MgCl$_2$.6H$_2$O % by wt | Setting Time at 90°C(min) | Strength psi |
| --- | --- | --- | --- | --- | --- |
| 10 | 40 | 14 |    | 105 | 410 |
| 10 | 40 |    | 14 | 60  | 1900 |
| 20 | 30 | 14 |    | 95  | 800 |
| 20 | 30 |    | 14 | 50  | 2200 |
| 25 | 25 | 14 |    | 80  | 950 |
| 25 | 25 |    | 14 | 45  | 2950 |
| 30 | 20 | 14 |    | 75  | 1130 |
| 30 | 20 |    | 14 | 40  | 3000 |
| 40 | 10 | 14 |    | 60  | 1340 |
| 40 | 10 |    | 14 | 35  | 3470 |

These results demonstrate that magnesium oxysulfate cements can provide adequate strengths and more controlled setting times than magnesium oxychloride cements. Furthermore, inasmuch as magnesium sulfate is typically significantly cheaper than magnesium chloride, the oxysulfate cements offer an economic advantage.

The above results also indicate that the strength and setting times of the cement are directly related to the proportion of magnesium oxide in the cement composition, the strength being increased with increasing proportions while setting times simultaneously decreased.

The well cementing operation in accordance with this invention is preferably carried out after the hole has been drilled with a magnesium salt drilling fluid. Such drilling fluids are clay-free when formulated and comprise an aqueous brine solution together with magnesium sulfate, dolomite and either magnesium oxide or calcium oxide as a promoter. The content of the brine solution can vary from about to about 170 pounds of salt per barrel (based upon a 42 gallon barrel). The precise combination of salts which will be used will vary depending upon the formations being drilled since it has been found that providing sufficient salt concentrations in the mud corresponding to salts found in formations being drilled can minimize swelling and sloughing in the borehole.

Most typically in the Western or Gulf coastal regions of the United States it is sufficient to provide a brine of potassium chloride or sodium chloride, or a mixture thereof, at concentrations of up to about 50 pounds per barrel. If, however, it is necessary to drill through formations containing magnesium chloride (e.g., carnallite or bischofite) or magnesium sulfate (e.g., allenite, kieserite or "bitter salts"), then these respective salts would be added to the brine solution. When drilling in Europe such formations are more frequently encountered. In some cases the formations being drilled will indicate use of brine solutions containing up to 170 pounds of salt per barrel in the drilling mud to attain the proper "salt balance" between the fluid and the formations being drilled.

Recognizing that the mud can therefore have a varying content of magnesium sulfate, dolomite and magnesium oxide, the transformation of a clay-free drilling mud of this type into a cement should be undertaken with a congnizance of the constituents already present in the brine, the clay-free magnesium salt muds usually contain from about 15 to 60 pounds per barrel magnesium sulfate (for example, in the form of epsom salts) from about 20 to 70 pounds per barrel dolomite, and from about 3 to 15 pounds per barrel of calcium oxide, magnesium oxide or dolomitic quicklime, together with small amounts of gypsum, about 4 to 10 pounds per barrel. The above ranges are typical, the nature of said drilling fluids being more explicitly explained in said co-pending U.S. application Ser. No. 300,389 incorporated by reference herein.

Other magnesium salt muds known in the prior art utilizing amniomium salts can also be transformed into cements in accordance with this invention. Reference to such prior art magnesium mud compositions appears in U.S. Pat. No. 2,856,256 and German Pat. No. 1,020,585, for example. It is generally preferred to employ the cementing methods and compositions of this invention when drilling with clay-free magnesium salt muds of the type wherein magnesium carbonate or dolomite is the filler present, if any. It will be recognized that the drilling operation will result in the entrainment of clays in the magnesium muds of the type described, and such entrainment does not preclude use of the mud in the cementing procedure.

Cementing operations in accordance with this invention can also be carried out by adding the ingredients to form an oxysulfate cement in other sea water muds containing lignosulfonate, carboxymethylcellulose, starch or the like. However, the clay content of the muds which are sought to be modified into cement must be maintained at a minimum inasmuch as significant amounts of clay adversely affect the magnesium oxysulfate cement product. In general the cement compositions of this invention may be employed with brine or sea water muds formulated having a low clay content. These low clay content muds generally have less than five pounds per barrel of swellable clay when formulated, and muds with this low clay content afford a good cement when used in conjunction with the compositions of this invention. It should be emphasized that in the preferred magnesium salt muds, a solids content of dolomite, magnesium carbonate or the like in excess of five pounds can be readily tolerated. The swellable clays however, adversely affect the cement composition and since typically there can be some amount of clay entrained in the fluid during the drilling operation, it is not preferred to attempt cementing using the compositions herein with muds originally formulated to contain more than five pounds per barrel of such clays.

In accordance with this invention cementing is accomplished by adding magnesium oxide, magnesium sulfate and dolomite or magnesium carbonate to a drilling fluid in amounts sufficient to produce a magnesium oxysulfate cement. To formulate the cementing composition the above materials are combined in amounts sufficient to provide from about 9 to about 40 parts by weight magnesium oxide, from about 12 to about 50 parts by weight magnesium sulfate and from about 20 to 60 parts by weight magnesium carbonate or dolomite. The monohydrate form of magnesium sulfate is preferred since the heptahydrate form (epsom salts) corrosive. This cement additive combination is then combined with the drilling mud, with or without addition of water for viscosity control and to provide a composition of pumpable viscosity. In general the magnesium salt-based muds are easily pumpable. For example, a magnesium salt-based mud of the type disclosed as mud formulations A, B and C, can demonstrate a viscosity of about 150 seconds yet be readily pumpable. Fresh water or brine may be added to the cement to control viscosity. Clay-based muds of such viscosity often result in undue pressure buildup. Generally the ultimate cement composition will contain from about 20 to percent by weight of water including that contributed by the mud depending upon the desired pumpability. Most often the cements using magnesium salt muds are formulated with from about 28 28 40 percent by weight water.

The cement compositions of this invention are not preferably formulated using silicon dioxide, sodium silicate or potassium silicate as fillers. Sodium silicate and diatomaceous earth as fillers result in an undue thickening of the cement composition. Silicon dioxide powder had a similar result and produces a greasy and crumbly product. Calcium carbonate as a filler adversely affects cement strength when added in amounts of about 15 percent by weight. The preferred filler material is accordingly dolomite or magnesium carbonate. Although thickening time and setting time is reduced, the use of dolomite and/or magnesium carbonate produces a strong expansive cement of low permeability.

A number of exemplary cement compositions were formulated using proportions as follows (by weight). Strength and setting time were determined at 90°C and 1 atmosphere pressure. Setting time is the time for the composition to reach a viscosity of 100 poise.

As can be seen from the above the use of the drilling mud, even contaminated mud C has the effect of extending setting times and slightly decreasing strength. The final strengths of the cements prepared in accordance with this invention are not reached within 24 hours. In testing the cements of Table 2 for strength after longer periods it was found that the strength of cement formation 1 rose from 280 psi at 24 hours to 310 at 72 hours and 700 after 168 hours. Similarly after 168 hours all compositions showed approximately proportional increases.

TABLE 2

| Cement | Water | $MgSO_4 \cdot H_2O$ | Dolomite | MgO | Setting Time (min) | Strength psi (24 hr) |
|---|---|---|---|---|---|---|
| 1 | 35.7 | 14.2 | 40.8 | 9.1 | 140 | 280 |
| 2 | 34.4 | 13.3 | 34.4 | 17.7 | 100 | 1348 |
| 3 | 34.0 | 16.4 | 24.7 | 24.7 | 75 | 1250 |
| 4 | 34.4 | 13.3 | 17.7 | 17.7 | 70 | 1348 |

A retarder was necessary to delay setting of the higher strength cements. Borax or sodium tetraborate was found to enable delay of setting times without adversely affecting strength. For example, 1 to 2 percent sodium tetraborate was found to delay setting time of cement composition 1 above to 200 to 400 minutes with a resultant strength over 300 psi. In compositions 3 and 4 the same proportion of sodium tetraborate increased setting times to 130 to 300 minutes, with strengths in excess of 580 psi (cement 3), and to 100 to 230 minutes with strengths in excess of 900 psi (cement 4). When one half percent by weight sodium tetraborate was added, little change in setting time was observed. Consequently approximately 1 to 4 percent by weight sodium tetraborate may be added to the compositions of this invention as a retarder. It should be noted that at 2 percent concentration this retarder results in a decrease of strength of about 10 percent which should be expected.

To illustrate the performance of the cements of this invention, varying cement compositions were formulated using water and using magnesium salt mud compositions. Briefly the mud compositions used were formulated as outlined below in parts by weight.

Mud A: 1000 parts water, 64 parts magnesium chloride, 72 parts magnesium sulfate (monohydrate), 20 parts potassium chloride and 44 parts sodium chloride, 3 parts gypsum, 3 parts dolomitic quicklime, 35 parts dolomite, and 30 parts starch.

Mud B: Same as composition of Mud A with double the amount of the salts (magnesium chloride, magnesium sulfate, sodium chloride and potassium chloride).

Mud C: 1000 parts water, 48 parts magnesium chloride, 54 parts magnesium sulfate (monohydrate), 165 parts sodium chloride, 15 parts potassium chloride, 30 parts gypsum, 3 parts dolomitic quicklime, 35 parts dolomite and 30 parts starch. This mud contained contamination of gypsum and clay.

When the above muds were used in place of water in the above cement compositions (of Table 2), with small adjustments of water for viscosity, results were as follows:

The cement formulations of Table I were tested in a testing device, wherein the cement could be subjected to increasing temperature and pressure during setting. The cement formulations of Table 2 were mixed with 2 percent and 4 percent sodium tetraborate. Setting time and strength were measured in the device with temperature increasing from 20° to 96°C and the pressure increasing from one atmosphere to 942 atmospheres within 84 minutes.

TABLE 4

| Cement Formulation | 2% Sod. Tetraborate | | 4% Sod. Tetraborate | |
|---|---|---|---|---|
| | Setting Time (min) | Strength (psi) | Setting Time (min) | Strength (psi) |
| 1 | 100 | 160 | 150* | 140* |
| 2 | 75 | 560 | 110* | 510* |
| 3 | 65 | 811 | 90 | 589 |
| 4 | 55* | 1065 | 80 | 981 |

(The values marked with asterisks are approximations believed to be accurate).

As can be seen from the above, downhole conditions will shorten setting time, however, the sodium tetraborate functions to delay this setting time acceptably though reducing strength as noted above.

The cement compositions of this invention may be otherwise provided with additives such as biocides and the like. Addition of small amounts of chloride salts such as chlorinated lime or iron chloride (specifically $FeCl_3 \cdot 6H_2O$) will increase strength while not strongly influencing setting time when used in amounts of about 1 to 3 percent by weight. It will be further understood that modifications may be made by use of naturally occurring materials such as naturally mined sulfate of potash magnesia (containing magnesium sulfate and potassium sulfate) or kieserite or epsomite to provide the magnesium sulfate in the compositions herein. Magne-

TABLE 3

| Cement Formulations | Mud A | | Mud B | | Mud C | |
|---|---|---|---|---|---|---|
| | Setting Time | Strength (psi) | Setting Time | Strength (psi) | Setting Time | Strength (psi) |
| 1 | 145 | 260 | 147 | 260 | 145 | 250 |
| 2 | 100 | 1220 | 105 | 1210 | 110 | 1100 |
| 3 | 80 | 1125 | 82 | 1100 | 85 | 1110 |
| 4 | 72 | 1200 | 74 | 1180 | 73 | 1250 | sium sulfate may also be provided in the monohydrate or heptahydrate form (epsom salts), although the latter is less preferred since the heptahydrate results in a more corrosive mixture. Magnesium oxide can be provided in natural magnesia or calcined natural products containing magnesium oxide. Other variations and modifications will be obvious to those skilled in the art.

The muds of this invention are used in cementing operations in accordance with well known techniques. The hardenable composition is formulated with the mud to form a cement "pill" which can be pumped to the desired interval of the borehole using spacers or well cementing tools known in the art. The pill of hardenable material may, of course, be pumped using the drilling fluid. When the pill is positioned at the desired interval in the borehole, circulation is stopped and the cement is permitted to harden and set. It will be readily understood that any of a number of accepted well cementing techniques may be used to position the cements of this invention, though prior use of scratchers and the like to prepare the borehole is ordinarily not necessary when drilling has proceeded with the magnesium salt type drilling fluids.

What is claimed is:

1. A method for cementing a well borehole being drilled with a salt water or brine based drilling fluid less than 5 pounds per barrel swellable clay, which comprises:
   a. admixing said drilling fluid with an additive composition comprising about 9 to about 40 parts by weight magnesium oxide, about 12 to about 50 parts by weight magnesium sulfate and from about 20 to about 60 parts by weight magnesium carbonate or dolomite to provide a hardenable composition of pumpable viscosity and containing from about 20 to about 40 percent by weight water;
   b. pumping said hardenable composition to the desired interval in said well borehole; and
   c. ceasing fluid circulation in said borehole to permit said hardenable composition to harden at said desired interval.

2. The method of claim 1, wherein the drilling fluid used in said admixing is a clay-free magnesium-salt based drilling fluid.

3. The method of claim 2, wherein said magnesium salt-based fluid contains magnesium sulfate, magnesium carbonate or dolomite and an oxide of calcium or magnesium.

* * * * *

PO-1050
(5/69)

UNITED STATES PATENT OFFICE
CERTIFICATE OF CORRECTION

Patent No. 3,887,009          Dated    June 3, 1975

Inventor(s)   Geo. L. Miller and Horst K. F. Barthel

It is certified that error appears in the above-identified patent and that said Letters Patent are hereby corrected as shown below:

Column 1, line 49, change "borehold" to --borehole--.

Column 4, line 28, change "4" to --24--.

Column 5, line 20, after the word "about", first occurrence, insert -- 15 --.

Column 6, line 41, after "(epsom salts)", insert --is more--;
     line 54, between the words "to" and "percent", insert --47--;
     line 57, chance "28", second occurrence, to --to--.

Column 7, line 54, change "30 parts gypsum" to --3 parts gypsum--.

Signed and Sealed this eleventh Day of November 1975

[SEAL]

Attest:

RUTH C. MASON                  C. MARSHALL DANN
*Attesting Officer*              *Commissioner of Patents and Trademarks*